United States Patent
Bommer et al.

[15] 3,674,102
[45] July 4, 1972

[54] PLATFORM BALANCE

[72] Inventors: Peter Bommer, Zurich; Hans Menzi, Stafa, both of Switzerland

[73] Assignee: Mettler Instruments AG, Zurich, Switzerland

[22] Filed: Aug. 30, 1971

[21] Appl. No.: 175,898

[30] Foreign Application Priority Data

Dec. 4, 1970 Switzerland..........................17919/70

[52] U.S. Cl................................177/256, 177/173, 177/178, 177/210, 177/237
[51] Int. Cl..................G01g 21/18, G01g 21/24, G01g 1/28
[58] Field of Search..........................177/256–259, 173–176, 177/178, 237, 210, 235, 248, 252

[56] References Cited

UNITED STATES PATENTS

| 310,542 | 1/1885 | Roeder et al. | 177/259 |
| 3,517,763 | 6/1970 | Peer | 177/173 |
| 3,566,983 | 3/1971 | Weickhardt | 177/173 |
| 3,595,330 | 7/1971 | Kuhnle | 177/258 |

FOREIGN PATENTS OR APPLICATIONS

| 1,114,045 | 12/1955 | France | 177/256 |
| 977,814 | 11/1950 | France | 177/173 |

OTHER PUBLICATIONS

H13764 IXb/42f, German printed application, Patentanmeldung, Bekanntgemacht am: 8 September 1955. (2 shts. dwg.; 2 pp. spec.) Inventor: Heinrich Heine Primary Examiner—Robert S. Ward, Jr.
Attorney—Lawrence E. Laubscher

[57] ABSTRACT

A platform balance including a housing, a weighing platform vertically movable relative to said housing, and at least one force indicating lever pivotally movable in accordance with the mass to be weighed by said balance, characterized in that the force indicating lever is pivotally supported in said housing beneath said platform at the upper end of a vertical support member the lower end of which is pivotally connected with the bottom wall of the housing, said force indicating lever being operable by the platform via load lever linkage means connected between the opposed side walls of the housing. In the illustrated embodiment, a pair of symmetrical force indicating levers are connected for pivotal movement in opposite directions to increase the sensitivity of measurement. Adjustable weight means are provided for varying the operating range of the balance, and tangent error is compensated for by appropriate selection of the dimensions and location of the center of gravity of the vertical support member.

12 Claims, 5 Drawing Figures

INVENTORS
Peter Bommer
Hans Menzi
BY:
Lawrence E. Laubscher
ATTORNEY

PLATFORM BALANCE

Known bridge balances generally include a load carrying means (the bridge or platform) supported, directly or by way of a bridge frame, on a plurality of load levers which are mounted in the balance housing and are connected by connecting members. Outside the region of the platform and offset vertically relative thereto, is a counter-balancing apparatus including a pivotally mounted force lever. The connection between the load levers and the force lever is made by a vertical traction rod which engages one end of the force lever. At its lower end the traction rod is either connected to an arm of a load lever, that arm being extended beyond a lateral limit of the platform balance, or is connected to the load levers by a separate intermediate lever which is mounted in the balance housing and to which the connecting member connecting the load levers is pivotally connected. As both the point of pivotal connection to the force lever and also the point of pivotal connection to the extended load lever or to the intermediate lever follow a circular path in the weighing operation, this type of construction is predominantly suited to balances having a given position of balance. When the balance is in the form of an inclination balance, there is a measuring error which can only be kept small by causing the vertical traction rod to be of a length which corresponds to the particular requirements of the balance as regards precision.

Accordingly, a primary object of the present invention is to provide an improved platform balance that includes a weighing platform connected with load lever linkage means via vertical connecting members, at least one force indicating lever being provided that is pivotally supported within the balance housing by a vertical support member that extends upwardly from the bottom wall of the housing, said force indicating lever being pivotally operable by an intermediate connecting link of said load lever linkage means. According to one feature of the invention, means are provided for horizontally adjusting the lower end of the vertical support member relative to the housing to control the sensitivity of the platform balance.

Another object of the invention is to provide a platform balance including a pair of force indicating levers that pivot in opposite directions about a common pivot axis, thereby increasing the sensitivity of the balance measurement. The force indicating levers are supported by vertical support members, which members are horizontally adjustable at their lower ends to afford a precise degree of symmetry and to achieve a constant zero point of balance indication even when the balance is slightly inclined.

A further object of the invention is to provide adjustable weight means for varying the loading of the intermediate connecting link to vary the weighing range of the balance. Means are provided for applying the adjustable weight means to the axis of the pivotal connection between the intermediate connecting link and the force indicating lever means.

Other objects and advantages of the invention will become apparent from a study of the following specifications when viewed in the light of the accompanying drawing, in which.

In the illustrated embodiment, an inclination balance is disclosed that includes switchable weights for increasing the weighing range, in which the weight corresponding to the inclination of the force indicating lever relative to the housing is indicated by optical projection means on a ground-glass plate disposed in the housing. For the sake of improved clarity, details not essential to the invention have been omitted from the drawings.

Figure 1:
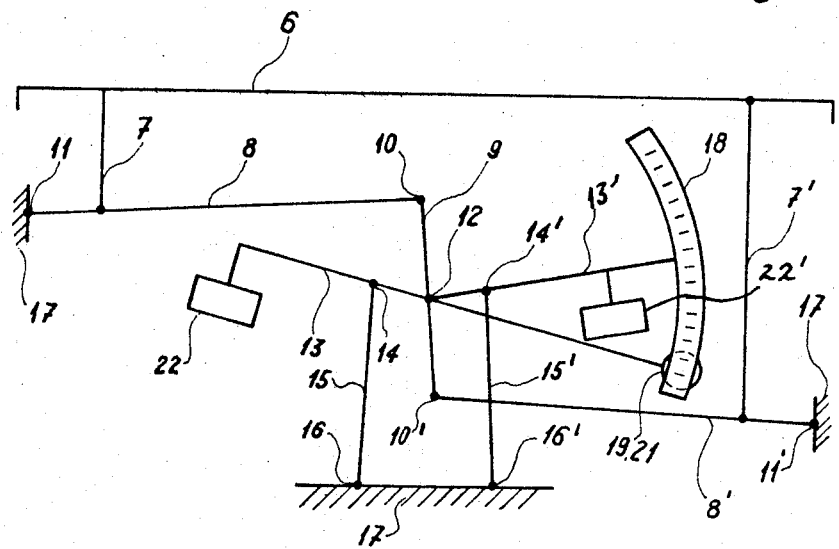
FIG. 1 is a diagrammatic view of the lever mechanism of the platform balance of the present invention.

Referring now to the diagrammatic view of FIG. 1, the balance comprises a platform 6 supported by way of connecting members 7, 7' on load levers 8, 8' which in turn are connected together by a common intermediate connecting link 9 by means of bearings 10, 10'. The load levers 8, 8' are pivotally connected with the balance housing 17 by pivots 11, 11'. The arrangement is preferably so constructed that the load levers 8, 8' lie in separate generally horizontal planes, and a line passing through the bearings 10, 10' lies in a substantially vertical plane.

Two force indicating levers 13, 13' are pivotally connected along pivot axis A—A (FIG. 3) by bearings 12 arranged half way between the bearings 10. The two force indicating levers 13, 13' are pivotally connected by bearings 14, 14' on support members 15, 15' which function as standing or inverted pendulums, said support members being pivotally mounted in turn by bearings 16, 16' on the balance housing 17. On its longer arm, one force lever 13' carries a measuring plate 18 which extends into the optical ray path issuing from a lamp 21.

In the preferred embodiment illustrated in the drawings, the lamp 21 and a lens 19, which form part of the optical projection system, are disposed at the free end of the longer arm of the force lever 13 in such a way that the movable parts 19 and 21 of the optical projection system move over the same circular path as the measuring plate 18, but in the opposite direction.

During a weighing operation, the platform 6 is depressed relative to the housing whereby load levers 8, 8' pivot downwardly to cause a downward movement of the intermediate connecting link 9; consequently, the force levers 13, 13' are pivotally moved in opposite directions, the pivot axis A—A through the bearings 12 moving virtually vertically downwardly. This is positively achieved by permitting the support members 15, 15' to perform a slight pivotal movement about the axis of each of their respective bearings 16, 16' while the bearings 14, 14' can carry out the necessary movements on a circular path (see also FIG. 5 in this regard). Owing to the two forces levers 13, 13' being oppositely inclined, there is a doubled relative movement of the optical projection system 19 and 21 relative to the measuring plate 18, until the position of equilibrium of the balance is attained, whereupon the image of the measuring plate, which corresponds to the particular weight on the platform 6, can be read off on the ground-glass plate (which, for simplicity, has been omitted from the drawings).

Owing to the doubled relative movement of the optical projection system and the measuring plate 18, it is possible to achieve a better degree of sensitivity or resolution with the same spacing between markings, or, to improve the sharpness of the image, it is possible to double the spacing between the markings. In practice, a compromise lying between these two extremes will generally be used.

The illustrated embodiment with two force indicating levers 13, 13' with a common pivot axis (line A—A in FIG. 3) through the bearings 12, 12' and the symmetrical arrangement of the support members 15, 15' with respect to the common pivot axis affords a further advantage. If the two force indicating levers 13, 13' are made symmetrical such that their centers of gravity provide components which correspond with each other in any position, and thus provide equal and opposite moments of rotation, this makes it possible to provide that the zero point of the balance indication becomes substantially more insensitive to proper levelling (i.e., the inclination of the support surface on which the balance is standing does not have an effect on the zero point within certain limits, for example ±0.5°). With this arrangement, both support members 15, 15' are preferably adjustable at their bases, in a direction parallel to the force levers 13, 13'.

Figure 2:
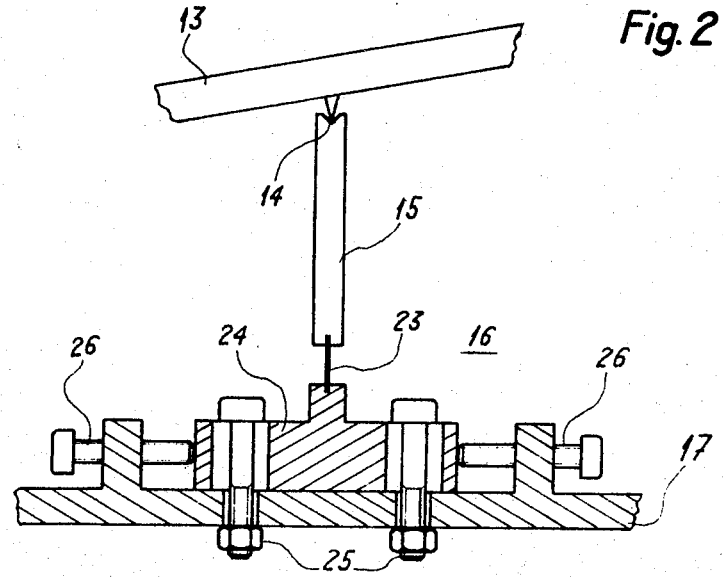
FIG. 2 is a detailed partly sectioned elevational view of a force lever support member.

FIG. 2 shows one of the support members 15, which is adjustable in this manner, and which is the same for both force levers. At its upper end, the support member 15 is provided with the knife-edge bearing 14 for supporting the force lever 13. The support member 15 is connected at its lower end with the base bearing 16 which comprises a resilient bearing 23 and an adjusting member 24, said adjusting member being connected with the balance housing 17 by screws 25 for adjustment by the alternate actuation of the adjusting screws 26.

The purpose of the adjustment of the base bearing 16 is to achieve precise symmetry of the two force indicating levers 13, 13' with respect to the common pivot axis A—A, in order to achieve the above mentioned constancy of the zero point of balance indication even when the balance is slightly inclined. Also, this permits correction of the balance sensitivity which may vary with the inclination of the support members 15, 15' that inclination being variable within certain limits.

Particularly in the case of balances with small weighing ranges, for reasons of economy and because of the lack of external friction, a resilient bearing will preferably be used as illustrated for the bearing 23, and also at other bearing locations at which the pivotal movement is only small and at which the restoring forces of such a bearing would not be troublesomely noticeable.

Figure 3:
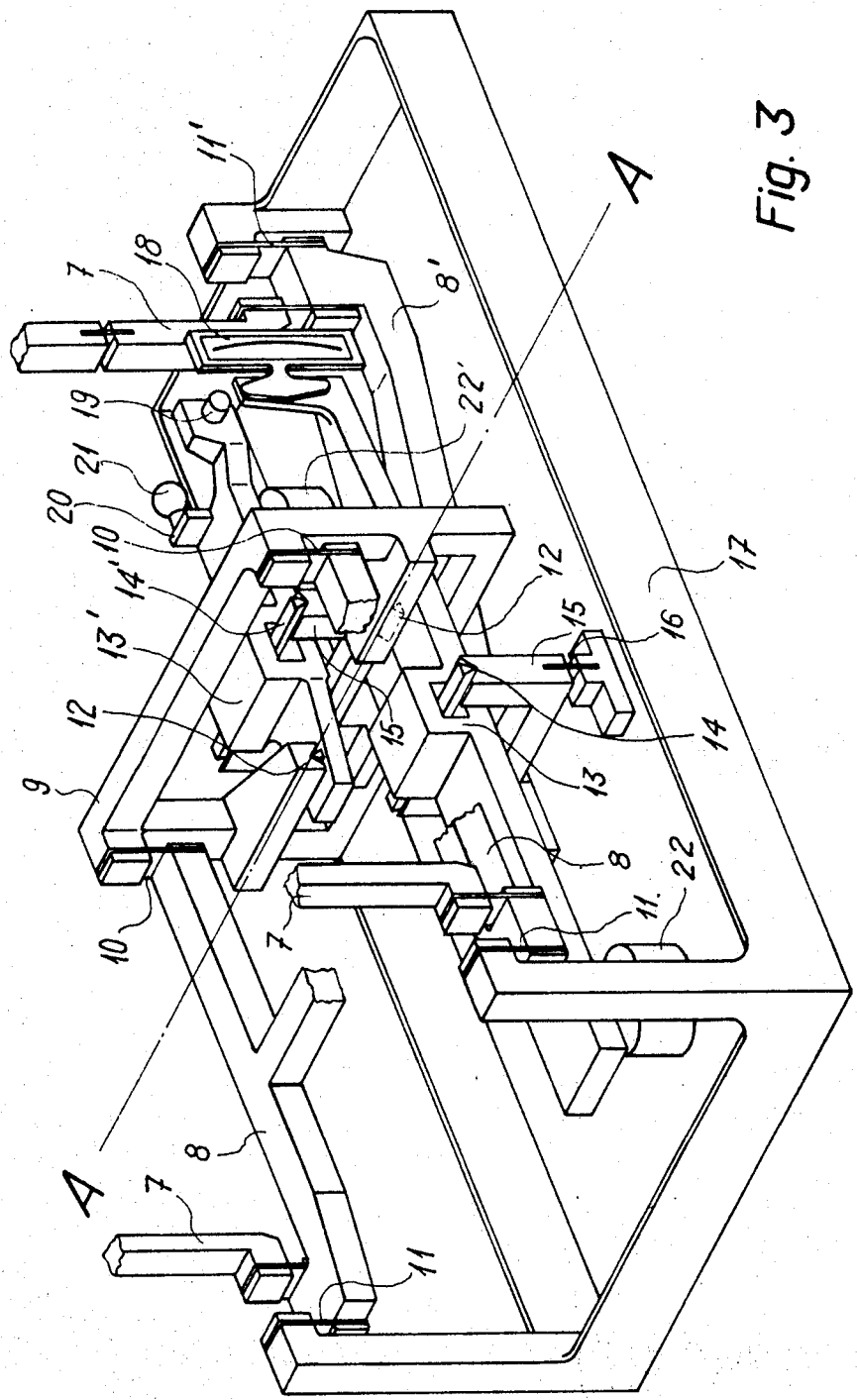
FIG. 3 is a perspective view of the platform balance.

FIG. 3 shows the structure of the complete balance. In this view, the platform 6 and parts of the housing 17 with the ground-glass plate are omitted as not being essential to an understanding of the invention. As essential components of the optical projection system, only the measuring plate 18, the lens 19 and the light source of lamp 21 disposed on a bracket 20 on one force lever 13, are illustrated in this figure. Counter-weights 22 and 22' are provided as weight compensation for the force levers 13, 13' respectively. The common pivot axis of the two force levers 13, 13' which extends through the bearings 12, is indicated by the line A—A.

Figure 4:
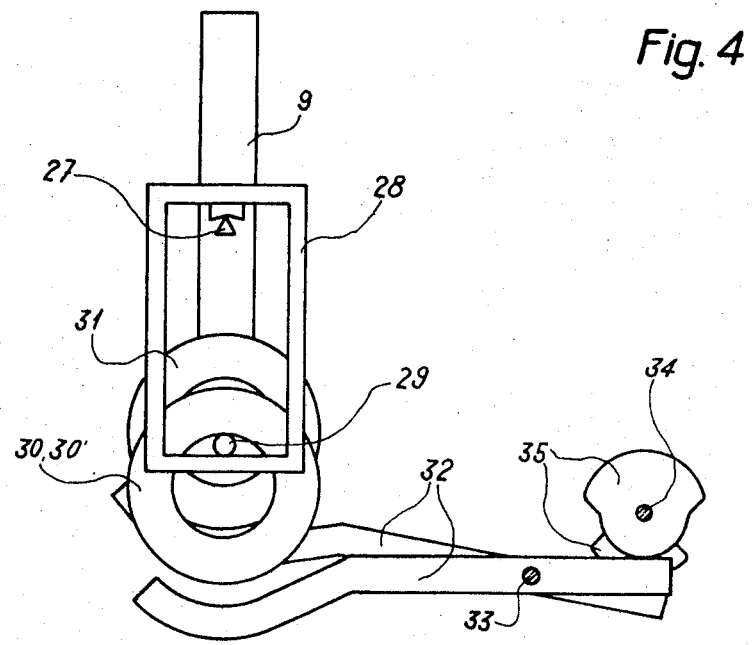
FIG. 4 is a detailed elevational view showing the switchable weights and the actuation thereof.

Also omitted for reasons of space in the perspective view are the additional switchable weights. These are shown in FIG. 4. Provided on the intermediate connecting link 9 is a knife-edge bearing 27, the line of contact of which coincides with the line A—A. Pivotally supported on the bearing 27 is a suspension member 28 having a carrier 29 for accommodating annular switchable weights 30, 30' and 31. The weights can be lifted or lowered by means of respective levers 32 which, being rotatably mounted on a shaft 33 fixed in the housing 17, are pivoted by the actuation of eccentrics 35 which are fixedly connected to a further shaft 34 mounted in the housing 17. The position illustrated is that in which the weights 30 and 30' (lying one behind the other in the drawing) are in the lowered position in which they act on the intermediate connecting link 9, while the weight 31 is raised. It should be noted in this respect that it is a false substitution insofar as the effect of the weight of the switchable weights 30, 30' and 31 on the change in weighing range is increased by the transmission factor. In the present embodiment, the switchable weights have values of 0.5 kp (weights 30, 30' ) and 1 kp (weight 31), and the transmission ratio is 1:10. This gives an increase in the weighing range by 20 kp.

Suspending the suspension member 28 at the pivot axis A-A insures that the weights 30, 30' and 31 act symmetrically on the force indicating levers 13, 13' relative to the transverse direction thereof (i.e., virtually in the same plane as the points of application of the forces transmitted by the load levers 8, 8' ). The weights will preferably also be arranged symmetrically relative to the longitudinal direction of the force indicating levers 13, 13', in order as far as possible to avoid torsional loadings thereon.

Figure 5:
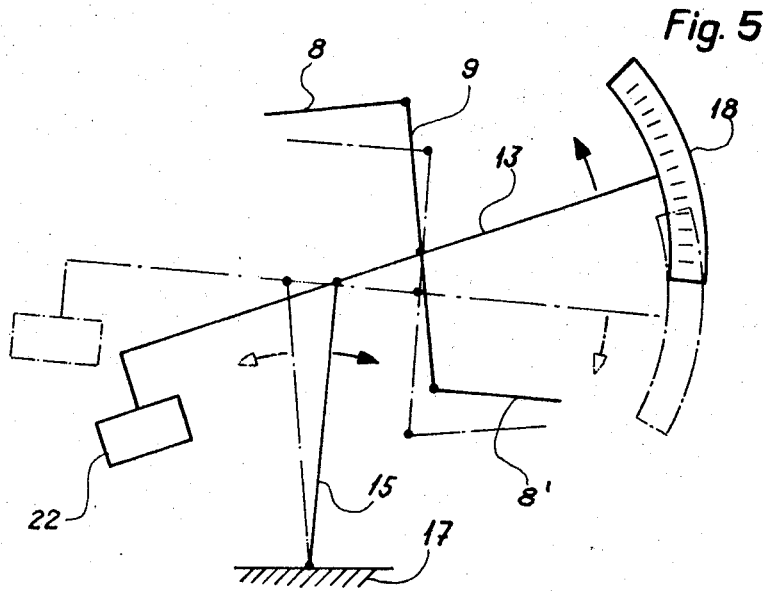
FIG. 5 is a diagrammatic view of a portion of the lever mechanism in two positions.

Finally, FIG. 5 illustrates a further advantage of the arrangement of the platform balance according to the invention. It is known that in the case of inclination balances, the angular sensitivity (i.e., the deflection per weight unit of the load platform 6) is not constant but is at a maximum in the horizontal position of the force indicating lever, and decreases when it is deflected upwardly or downwardly. This effect, which is known as a tangent error, is usually corrected by modifying the spacing between the markings on the measuring plate 18. This however also gives rise to problems when using micrometer scales or similar auxiliary means for determining the last decimal places of the indicated value of a weight, as these auxiliary means only provide a precise result when the spacings between the markings are constant over the entire range of inclination of the balance.

Referring to FIG. 5, it is important to note that in a balance according to the invention, in which a force indicating lever is supported by a pivotally mounted support member acting as a standing pendulum, it is now possible substantially to compensate for the above mentioned tangent error by suitable dimensioning of the support member as regards its length and the location of its center of gravity, as the pendulum position which is associated with each angle of inclination of the force indicating lever provides a component which acts on the force indicating lever to provide an increase in the deflection angle corresponding to the balance loading, relative to the horizontal. This makes it possible for the spacings between markings on the measuring plate to be kept constant. The arrows in FIG. 5 clearly illustrate in each case the above described effect, the force indicating lever being shown in two positions by the solid and phantom lines, respectively.

As mentioned, the embodiment selected for illustration is an inclination balance with two force indicating levers. Further constructions in accordance with the invention would be, for example, inclination balances with only one force lever. These would in fact be simpler in construction, but they would not show the insensitivity to level; also, the apparent increase in travel of the measuring plate would no longer be so easy to achieve. The force indicating lever being in the form of a standing or inverted pendulum is of advantage particularly when the balance is an inclination balance.

The construction having only one force lever is also suitable for use as an electro-magnetically operated balance (for example, with a moving coil system for force compensation and with inductive or capacitive sensing). In this case, the weight could be indicated in known manner (for example, by means of a separate digital voltmeter).

The above described balance is compact and does not require a traction rod acting as a connecting member between load and force indicating levers. Also the weighing apparatus is no longer arranged above but lies below the platform, and is preferably disposed in a space which does not, or not to any substantial degree, extend horizontally beyond the region of the platform, while operating with a precision which at least corresponds to that of a conventional platform balance. Such a balance can be conceived in the form of an inclination balance without the above mentioned limitation as regards measuring error.

While in accordance with the provisions of the Patent Statutes the preferred form and embodiments have been illustrated and described, it is apparent that other changes and modifications may be made without deviating from the inventive concept.

What is claimed is:

1. A platform balance, comprising
   a. a housing (17) containing a chamber defining bottom and opposed side walls;
   b. a weighing platform (6) arranged for vertical movement adjacent the upper end of said housing;
   c. at least one force indicating lever (13);
   d. vertical support means supporting said force indicating lever for pivotal movement within said housing, said vertical support means including a vertical support (15) pivotally connected at its lower end with and extending upwardly from said bottom wall, said force indicating lever being pivotally connected with the upper end of said vertical support member; and
   means connecting said force indicating lever for operation by said platform, including
   1. load lever linkage means connected between said housing side walls, said load lever linkage means including a pair of load levers (8, 8') one of which is pivotally connected at one end with one of said side walls and the other of which is pivotally connected at one end with the other of said side walls, and an intermediate connecting link (9) pivotally connected between the other ends of said load levers, respectively, said intermediate connecting link also being pivotally connected with said force indicating lever; and 2. a pair of vertical connecting members (7, 7') pivotally connected at their lower ends with said load levers, respectively, said vertical connecting members being connected at their upper ends with said platform.

2. Apparatus as defined in claim 1, wherein the pivotal connections between said load levers and said side walls are arranged at vertically spaced elevations; wherein the lengths of said load levers are such that said intermediate connecting link normally has a generally vertical orientation; and further wherein said force indicating lever is pivotally connected with said intermediate connecting link at a point approximately midway between the pivotal connections of said intermediate connecting link and said load levers.

3. Apparatus as defined in claim 1, and further including base bearing means (16) connecting the lower end of said vertical support member with said housing bottom wall, and means (26) for horizontally adjusting the position of base bearing means relative to said housing.

4. Apparatus as defined in claim 1, and further including resilient bearing means (23) connecting the lower end of said vertical support member with said housing bottom wall.

5. Apparatus as defined in claim 1, and further including another force indicating lever (13') symmetrical with said one force indicating lever, said force indicating levers being connected with said intermediate connecting link for pivotal movement in opposite directions about a common pivot axis (12).

6. Apparatus as defined in claim 1, and further including optical means including a projection device for indicating optically the weight to be measured as a function of the angle of inclination of said force indicating lever relative to said housing.

7. Apparatus as defined in claim 1, and further including electro-magnetic means cooperating with said force indicating lever for determining the weight to be measured.

8. Apparatus as defined in claim 1, and further including switchable weight means (30, 30', 31) adapted for connection with said intermediate connecting link to increase the weighing range of said balance.

9. Apparatus as defined in claim 8, wherein said switchable weight means are connected with said intermediate connecting link along a horizontal pivot axis (27) that is colinear with the axis (12) of the pivotal connection between said force indicating lever and said intermediate connecting link.

10. Apparatus as defined in claim 6, wherein said vertical support member (15) is positioned and dimensioned to compensate for the tangent error occurring in the inclination of the force indicating lever by appropriate variation in the deflection resulting from the inclination of said vertical support member.

11. Apparatus as defined in claim 5, and further including another vertical support member (15') pivotally supporting said other force indicating lever, and optical readout means for indicating the relative angular orientation of said force indicating levers, said optical readout means including a lamp and lens system (19, 21) connected with one of said force indicating arms, and a graduated measuring plate (18) connected with the other of said force indicating levers.

12. Apparatus as defined in claim 5, wherein said one force indicating lever (13) is pivotally connected intermediate its ends with said intermediate connecting link (9), wherein an end portion of said one force indicating lever and said other force indicating lever extend on the opposite side of said intermediate connecting link from the pivotal connection between said one force indicating lever and said vertical support member; and further including another vertical support member (15') pivotally supporting said other force indicating lever.

* * * * *